US012798329B2

(12) United States Patent
Fowler et al.

(10) Patent No.: US 12,798,329 B2
(45) Date of Patent: Nov. 17, 2026

(54) VEHICLE AIRFLOW SYSTEM

(71) Applicant: JAGUAR LAND ROVER LIMITED, Whitley (GB)

(72) Inventors: Andrew Fowler, Coventry (GB); Valentina Fernandes, Leamington Spa (GB)

(73) Assignee: JAGUAR LAND ROVER LIMITED, Whitley (GB)

( * ) Notice: Subject to any disclaimer, the term of this patent is extended or adjusted under 35 U.S.C. 154(b) by 414 days.

(21) Appl. No.: 18/564,549

(22) PCT Filed: May 25, 2022

(86) PCT No.: PCT/EP2022/064332
§ 371 (c)(1),
(2) Date: Nov. 27, 2023

(87) PCT Pub. No.: WO2022/248624
PCT Pub. Date: Dec. 1, 2022

(65) Prior Publication Data
US 2024/0253422 A1 Aug. 1, 2024

(30) Foreign Application Priority Data
May 27, 2021 (GB) ..................................... 2107578

(51) Int. Cl.
*B60H 1/00* (2006.01)

(52) U.S. Cl.
CPC ....... *B60H 1/00828* (2013.01); *B60H 1/0073* (2019.05); *B60H 1/00878* (2013.01); *B60H 2001/00733* (2019.05)

(58) Field of Classification Search
CPC ............. B60H 1/00828; B60H 1/0073; B60H 1/00878; B60H 2001/00733
(Continued)

(56) References Cited

U.S. PATENT DOCUMENTS 6,454,178 B1 * 9/2002 Fusco .................... B60H 1/008 165/203
8,839,632 B2 * 9/2014 Goenka ............. B60H 1/00742 62/3.61
(Continued)

OTHER PUBLICATIONS

Combined Search and Examination Report corresponding to application GB2107578.3 dated Nov. 17, 2021, 10 pages.
(Continued)

*Primary Examiner* — Avinash A Savani
*Assistant Examiner* — Dana K Tighe
(74) *Attorney, Agent, or Firm* — TROUTMAN PEPPER LOCKE; Dustin B. Weeks; Nicholas H. Doss

(57) ABSTRACT

Aspects of the present invention relate to a vehicle system for use in a vehicle (8). The vehicle system comprises: an airflow system configured to condition air in a cabin (10) of the vehicle (8), the airflow system comprising at least one air vent (24, 26) disposed in the cabin (10) and an airflow apparatus (34, 36) configured to direct an airflow through the at least one vent (24, 26); an interface arrangement comprising a first input module (28) and a second input module (28), the first and second input modules (28) each being configured to issue airflow demand signals in response to user input; and a control system (30) comprising one or more controllers (30).
The control system (30) is configured to: receive an airflow demand signal issued by either of the first and second input modules (28); determine, in accordance with the received airflow demand signal, an airflow map (60) defining a function of an airflow parameter with respect to a cabin temperature and/or a cabin heating power demand; and operate the airflow system in accordance with the determined airflow map (60) to control the airflow through the at least one vent (24, 26).

20 Claims, 8 Drawing Sheets

(58) Field of Classification Search
USPC ........................................................ 454/75
See application file for complete search history.

(56) References Cited

U.S. PATENT DOCUMENTS

| | | | | |
|---|---|---|---|---|
| 10,717,339 | B2 * | 7/2020 | Chevers ............ | B60H 1/00885 |
| 2003/0089788 | A1 | 5/2003 | Ohga | |
| 2004/0129007 | A1 | 7/2004 | Tomita | |
| 2010/0236770 | A1 * | 9/2010 | Pursifull ............ | B60H 1/00764<br>165/202 |
| 2016/0137028 | A1 * | 5/2016 | Trego ................. | B60H 1/00871<br>165/203 |
| 2017/0368909 | A1 * | 12/2017 | Choi .................. | B60H 1/00064 |
| 2018/0170151 | A1 | 6/2018 | Ostermeier | |
| 2019/0322154 | A1 * | 10/2019 | Ganguly ............ | B60H 1/00742 |
| 2020/0189355 | A1 | 6/2020 | Shin et al. | |

OTHER PUBLICATIONS

International Search Report and Written Opinion corresponding to application PCT/EP2022/064332, dated Oct. 13, 2022, 11 pages.

* cited by examiner

VEHICLE AIRFLOW SYSTEM

TECHNICAL FIELD

The present disclosure relates to a vehicle airflow system such as a heating, ventilation and air conditioning (HVAC) system, and in particular to a control arrangement for a vehicle airflow system, to a vehicle including such a system, to a method of controlling a vehicle airflow system and to a non-transitory, computer-readable medium.

BACKGROUND

Most vehicles include an HVAC system for conditioning air within a cabin of the vehicle. HVAC systems typically include airflow apparatus including an HVAC assembly including at least one 'blower' in combination with thermal systems such as heat exchangers and coolant circuits for heating and/or cooling air. The blower comprises a fan motor that drives a fan wheel to pump heated or cooled air through a set of vents distributed around the cabin to adjust the cabin temperature towards a target value.

HVAC systems are often configured to provide each vehicle occupant a degree of individual control over operation of the system. This typically entails dividing the cabin interior into multiple zones, each zone being associated with a respective vehicle seat and being served by at least one vent of the HVAC system that delivers conditioned air into the zone. Local control is enabled for each zone, in particular to allow a user to control airflow through the local vent to some extent, or to adjust a target temperature for the zone, which may be different to those for other zones.

Local control for individual zones may be implemented via a set of local control modules, each local control module being located so that it is accessible for an occupant of the seat of a respective zone, to provide a control interface for the occupant. In known implementations, rotary control members and/or touchscreen interfaces may be used to enable the user to input commands, for example. A local control module may offer functions such as adjusting the target zone temperature, or the ability to switch between automatic and manual modes of operation for the HVAC system.

In this respect, a manual mode of operation typically allows the user to fix the flow rate of air through a vent at one of a set of predetermined levels, in which case the system may no longer control the cabin temperature to a target value effectively. In the automatic operating mode, the air flow rate is controlled according to the temperature demand.

Commands issued by the local control modules are typically received by a central control module, which takes those commands into account when operating the airflow apparatus. The way in which the central control module implements commands received from the local control modules is dictated by the capabilities of the airflow apparatus. For example, in many HVAC systems a single blower serves all zones of the cabin, in which case it may not be possible to implement manual control in some zones and automatic control in others. In this case, if one user selects a manual operating mode via the relevant local control module, this may force the entire system to switch to a manual mode for all zones, which may conflict with the expectations of other occupants of the vehicle.

It is against this background that the present invention has been devised.

SUMMARY OF THE INVENTION

Aspects and embodiments of the invention provide a vehicle system, a vehicle, a method, computer software and a non-transitory, computer-readable storage medium as claimed in the appended claims.

According to an aspect of the present invention there is provided a vehicle system for use in a vehicle. The vehicle system comprises: an airflow system configured to condition air in a cabin of the vehicle, the airflow system comprising at least one air vent disposed in the cabin and an airflow apparatus configured to direct an airflow through the at least one vent; an interface arrangement comprising a first input module and a second input module, the first and second input modules each being configured to issue airflow demand signals in response to user input; and a control system comprising one or more controllers. The control system is configured to: receive an airflow demand signal issued by either of the first and second input modules; determine, in accordance with the received airflow demand signal, an airflow map defining a function of an airflow parameter with respect to a cabin temperature and/or a cabin heating power demand; and operate the airflow system in accordance with the determined airflow map to control the airflow through the at least one vent.

By operating the airflow system in accordance with an airflow map determined with respect to an airflow demand signal, the vehicle system creates a semi-automatic mode of operation in which users are able to alter an airflow parameter, such as the intensity of airflow delivered through the air vent, whilst retaining automatic control of the cabin temperature. For example, the airflow map can define airflow intensity as a function of an error between a measured cabin temperature and a target cabin temperature, and this function can be manipulated to become more or less aggressive as required to produce the change in airflow requested by a user. This beneficially avoids a need to switch to a fully manual operating mode for the airflow system to allow users to demand altered airflow.

The airflow system may be an HVAC system, for example, and the airflow apparatus may comprise one or more HVAC assemblies, for example, each of which may comprise a fan, or 'blower', together with thermal equipment for heating and/or cooling air.

The airflow parameter may comprise a flow rate and/or a power level for a fan of the airflow apparatus.

The airflow demand signals issued by the first and second input modules may be indicative of a user demand for an altered flow rate through the at least one vent.

The control system may be configured to determine the airflow map by selecting the airflow map from a set of such airflow maps. Optionally, each airflow map of the set defines a respective relationship between a flow rate and/or a power level for a fan of the airflow apparatus and the cabin temperature and/or the cabin heating power demand. Alternatively, the control system may manipulate or reshape an existing airflow map to produce the required airflow map.

In some embodiments, the control system is configured to operate the airflow system to control a flow rate of air flowing through the at least one vent.

The control system may be configured to operate the airflow system to control a temperature of air flowing through the at least one vent.

The airflow system may comprise a first air vent configured to direct air into a first region of the cabin and a second air vent configured to direct air into a second region of the cabin, as for a multi-zone climate control system, for example. The first input module may be configured to issue an airflow demand signal relating to airflow through the first vent and the second input module may be configured to issue an airflow demand signal relating to airflow through the second vent.

The control system may be configured to: operate the airflow system to control airflow through the first vent in accordance with a first airflow map determined in accordance with an airflow demand signal received from the first input module; and operate the airflow system to control airflow through the second vent in accordance with a second airflow map determined in accordance with an airflow demand signal received from the second input module. This may be possible, for example, where the airflow system includes multiple airflow apparatus, for example a front HVAC assembly and a rear HVAC assembly, which can be controlled individually based on respective airflow maps.

The first and second input modules may each be associated with respective seats of the vehicle, in which case the interface arrangement may comprise further input modules that are each associated with respective seats of the vehicle.

Each input module optionally comprises a rotary control member and/or a display.

The interface arrangement may comprise an interface module associated with an instrument panel of the vehicle, which may form part of an infotainment system, for example.

The airflow map may define a function of an airflow parameter with respect to a difference between the cabin temperature and a target cabin temperature.

The first input module and/or the second input module may be configured such that a mode switching action must be performed on the module before a user can input a request defining an airflow demand signal. In such embodiments, the first input module and/or the second input module may be configured such that performing the mode switching action a second time selects a manual operating mode. The mode switching action may comprise pushing or pulling a control member of the first input module and/or the second input module, for example.

The control system may be configured to receive signals indicative of the cabin temperature and a target temperature, and to process the received signals to determine the cabin heating power demand.

The one or more controllers may collectively comprise at least one memory device electrically coupled to the at least one electronic processor and having instructions stored therein, in which case the at least one electronic processor is configured to access the at least one memory device and execute the instructions thereon so as to determine the airflow map and operate the airflow system.

The one or more controllers may collectively comprise an input configured to receive signals indicative of any of: airflow demand issued by either of the first and second input modules; a cabin temperature; a target temperature; and an operating mode.

The invention also extends to a vehicle comprising the vehicle system of the above aspect.

Another aspect of the invention provides a method of controlling a vehicle airflow system that is configured to condition air in a cabin of the vehicle. The airflow system comprises at least one air vent disposed in the cabin and an airflow apparatus configured to direct an airflow through the at least one vent. The method comprises: receiving, from an input module associated with a seat of the vehicle, an airflow demand signal indicative of a user demand for an altered flow rate through the at least one vent; determining, in accordance with the signal indicative of the airflow demand signal, an airflow map defining a function of an airflow parameter with respect to the cabin temperature and/or a cabin heating power demand; and operating the airflow system in accordance with the airflow map to control airflow through the at least one vent.

Determining the airflow map may comprise selecting the airflow map from a set of such airflow maps.

Further aspects of the invention provide computer software that, when executed, is arranged to perform a method of the above aspect, and a non-transitory, computer-readable storage medium storing instructions thereon that, when executed by one or more electronic processors, causes the one or more electronic processors to carry out the method of the above aspect.

Within the scope of this application, it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

In general terms, embodiments of the invention provide an enhanced user interface for existing vehicle airflow systems such as HVAC systems, to enhance individual control over operating parameters for the airflow system without having to alter the airflow hardware. In particular, embodiments of the invention enable an airflow system to provide an expected response when a user requests an altered airflow rate into the cabin, whilst continuing to operate airflow apparatus to maintain automatic temperature control. For example, if a user requests an increased air flow rate, the system can deliver increased airflow in the short term whilst continuing to control the flow rate to maintain a target temperature in the longer term. In some embodiments, the system switches to a manual mode following further interaction from the user.

The proposed approach involves modifying or switching an airflow map that relates air flow rates to a present deviation from a target cabin temperature, which deviation may also be represented as a heating or cooling power demand. Switching to a different airflow map yields a short-term change in air flow through one or more vents in a vehicle cabin to meet a corresponding request for increased or decreased airflow from the user, without relinquishing automated control of the cabin temperature.

Figure 1:
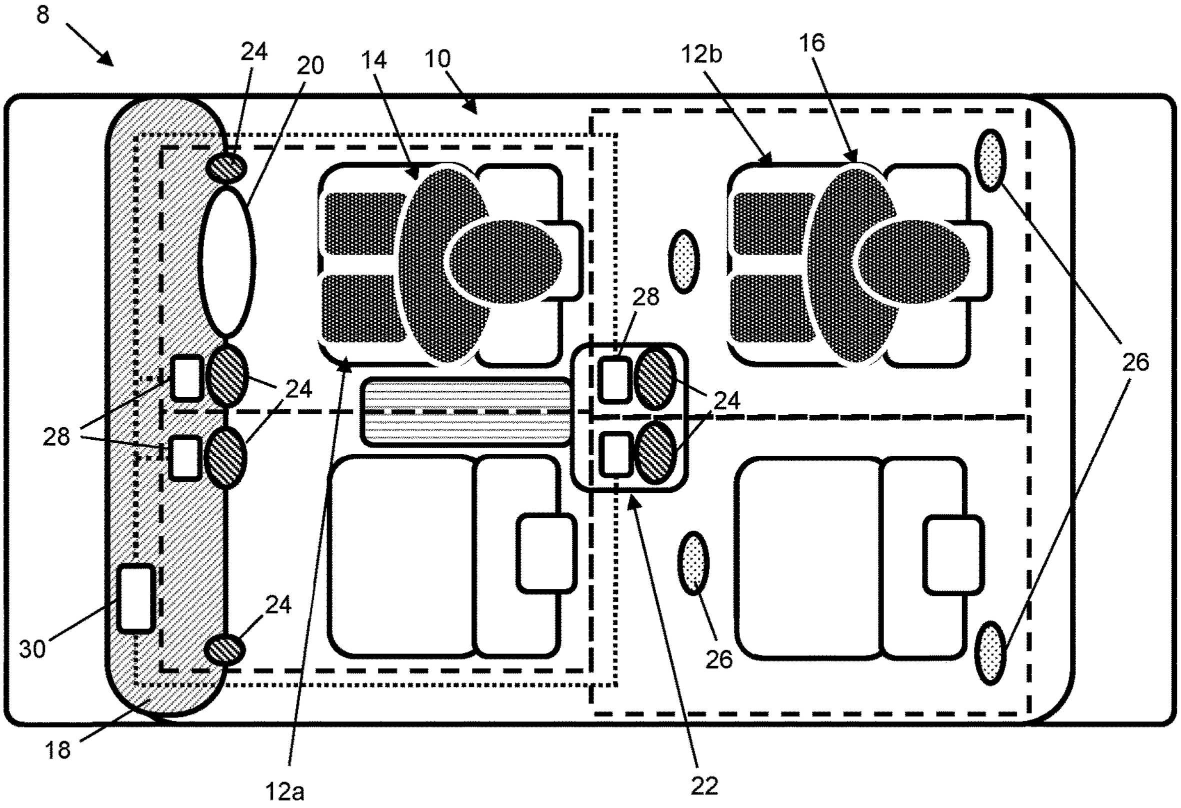
FIG. 1 shows in schematic plan view a vehicle to which embodiments of the invention may be applied.

To provide context for the invention, FIG. 1 shows, in simplified schematic form, a vehicle 8 having a cabin 10 in which embodiments of the invention may be implemented.

In this example, the cabin 10 accommodates four seats 12, including two front seats 12*a* and two rear seats 12*b*. Two of the seats 12 are occupied in FIG. 1: a first occupant, namely a driver 14, is seated in a driver's seat 12*a*, which is shown at the top left of FIG. 1; and a second occupant 16 is seated in a rear seat 12*b* that lies directly behind the driver's seat 12*a*.

An instrument panel 18 extends across a front portion of the cabin 10 and supports various controls for the driver 14, including the steering wheel 20 shown in FIG. 1. Further user controls are also provided by way of a rear centre console 22 that extends between the front seats 12*a* to provide control interfaces for occupants of the rear seats 12*b*, as is conventional.

The vehicle 8 also includes an HVAC system, hereafter referred to as an 'airflow system', which is shown in more detail in FIGS. 2 to 4 and described later. The airflow system is a multi-zone system of a known kind that provides semi-independent conditioning of air in four separate zones of the cabin 10, these zones being demarcated by dashed lines in FIG. 1. Each zone contains a respective seat 12, such that the airflow system offers a degree of individual control over the operation of the airflow system for any occupants of the vehicle 8, allowing each occupant to condition their respective local region of the cabin 10 as desired.

To achieve multi-zone control, each zone includes, or is otherwise served by, at least one respective main vent 24 through which the airflow system delivers heated and/or cooled air to the zone. Each of the main vents 24 is directed rearwardly into its respective zone in this example. As is common, a row of four main vents 24 is supported by the instrument panel 18 at approximately face level for occupants of the front seats, two of the main vents 24 being positioned centrally on the instrument panel 18 and the remaining two at respective ends of the instrument panel 18. Accordingly, each of the two front zones of the cabin 10 is served by two of the main vents 24 in the instrument panel 18. Three further main vents in the instrument panel 18, which are omitted from FIG. 1 for simplicity, include a defrost vent at the base of a windscreen of the vehicle 8 and a respective main vent for each side window.

A further pair of main vents 24 are located in the rear centre console 22, each of these vents being associated with a respective one of the two rear zones of the cabin 10. Accordingly, there are six main vents 24 visible in total in the example shown in FIG. 1.

In addition to the face-level main vents shown in FIG. 1, four foot-level main vents are also provided that are not shown, each serving a respective seat 12 of the vehicle 8.

Accordingly, in total the cabin 10 includes thirteen main vents 24.

To supplement the main vents 24, four auxiliary vents 26 are also provided to enhance the ability of the airflow system to control air temperature and ventilation levels individually in each zone. More particularly, the main vents 24 are primarily responsible for delivering conditioned air to the front zones, whereas the auxiliary vents 26 predominantly serve the rear zones. The auxiliary vents 26 include a respective auxiliary vent 26 disposed beneath each of the rear seats 12*b*, and a further auxiliary vent 26 positioned above each rear seat 12*b* in a roof of the cabin 10. If the vehicle 8 includes a third row of seats, further auxiliary vents at foot-level are provided to serve the third row.

Each zone also includes a respective local control module 28 enabling an occupant seated in the associated zone to alter control parameters relating to airflow into the zone through the associated vents, as shall be described in more detail later. Each local control module 28 is positioned to be readily accessible by an occupant of the seat 12 of the associated zone. In this case, the local control modules 28 associated with the two front zones are located in the instrument panel 18 adjacent to the central main vents 24, and the local control modules 28 associated with the two rear zones are located in the rear centre console 22 adjacent to the associated main vents 24. The local control modules 28 are described in more detail later with reference to FIG. 5.

The four local control modules 28 are all connected to a common central control module 30 that is housed within the instrument panel 18. The central control module 30 is configured to receive commands from the local control modules 28 and also to transmit signals to the local control modules 28 that are indicative of, for example, the present state and the selected operating mode for the respective zone for each local control module. FIG. 1 shows lines of communication between the local control modules 28 and the central control module 30, which may be implemented using any suitable vehicle communications network.

The central control module 30 also receives signals from a network of sensors (not shown) distributed around the vehicle 8, in particular signals indicative of temperature from temperature sensors positioned in each zone of the cabin 10.

The central control module 30 is further configured to issue control signals to control operation of the airflow system, the control signals being determined, at least in part, in accordance with the signals received from the sensor network and from the local control modules 28.

Accordingly, the central control module 30 and the local control modules 28 collectively define a control system that governs operation of the airflow system.

It should be appreciated that the arrangement and number of vents shown in FIG. 1 is purely illustrative and will vary for different vehicles. Similarly, the positioning of the local control modules 28 and central control module 30 may differ in practice. It is also possible for one of the local control modules 28 to be designated as the central control module 30, such that a dedicated central control module 30 is not required. Embodiments of the invention are applicable to all such variants.

Figure 2:
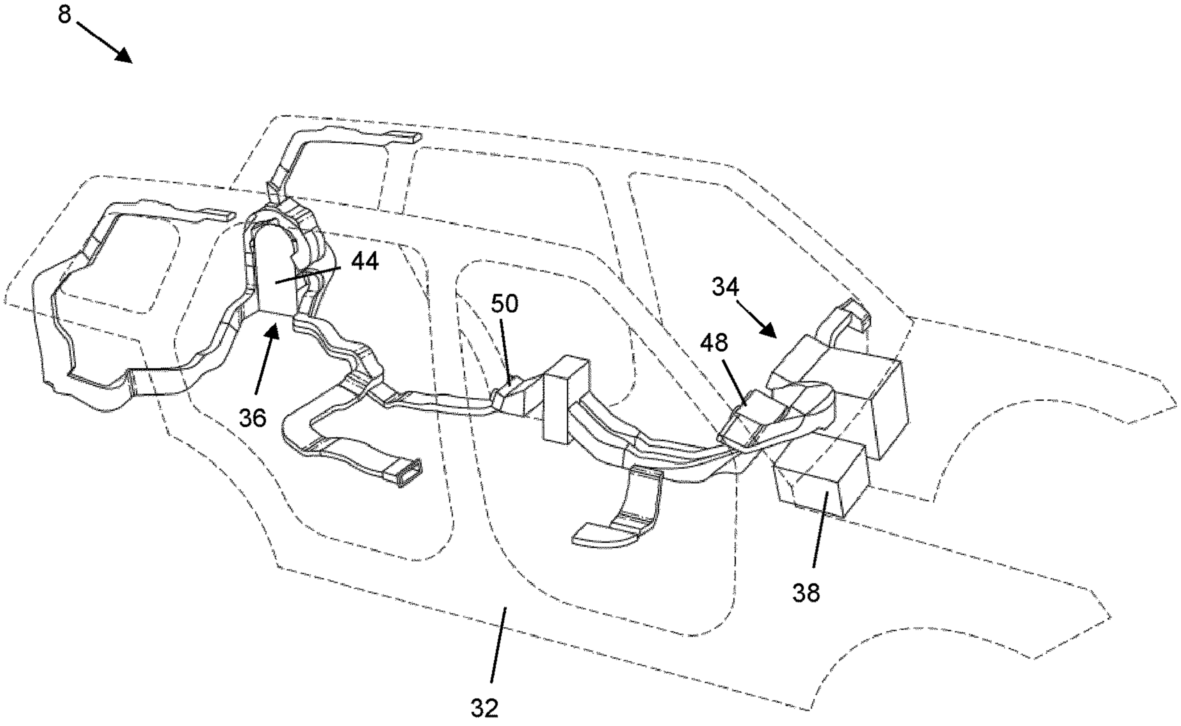
FIG. 2 shows parts of an airflow system of the vehicle of FIG. 1 in perspective view.
Figure 3:
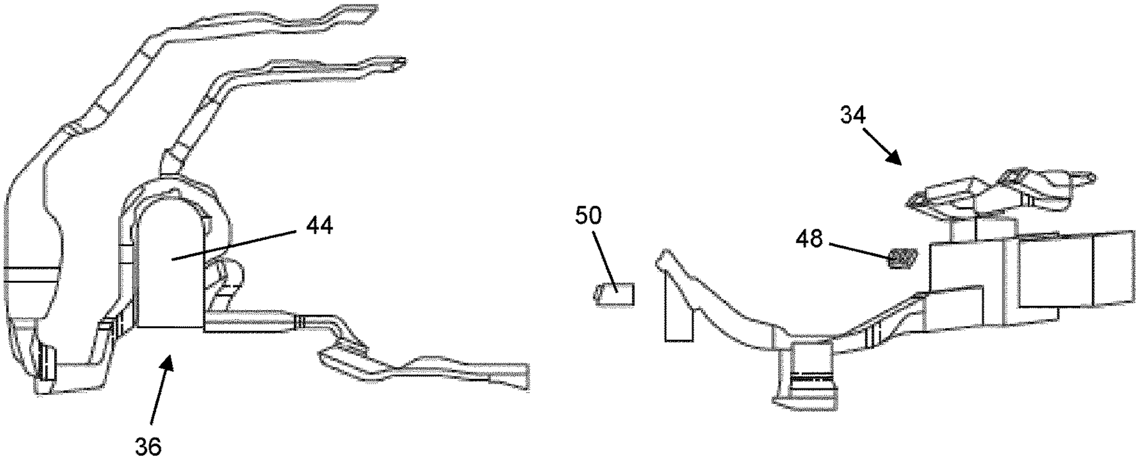
FIG. 3 corresponds to FIG. 2 but shows the airflow system in side view.
Figure 4:
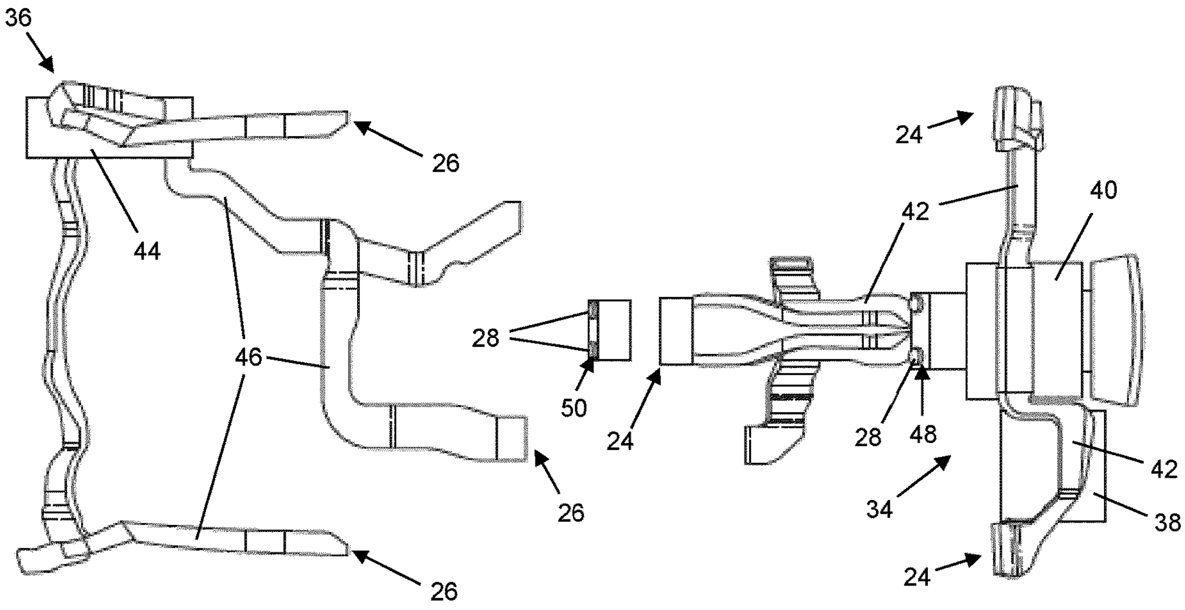
FIG. 4 corresponds to FIG. 2 but shows the airflow system in plan view.

FIGS. 2 to 4 show components of the airflow system that delivers conditioned air to the vents shown in FIG. 1. FIG.

2 shows parts of a frame 32 of the vehicle 8 for context, while FIGS. 3 and 4 show the airflow system components in isolation.

As FIGS. 2 to 4 show, the airflow system comprises a main HVAC assembly 34 disposed in a front portion of the vehicle 8 that is configured to deliver conditioned air to the main vents 24, and an auxiliary HVAC assembly 36 disposed in a rear portion of the vehicle 8 that is configured to deliver conditioned air to the auxiliary vents 26.

In this embodiment, the main HVAC assembly 34 and the associated main vents 24 are configured to condition air primarily in the front two zones, while the auxiliary HVAC assembly 36 and auxiliary vents 26 are configured to condition air in the rear two zones. It is noted, however, that in some embodiments the auxiliary HVAC assembly 36 and the associated auxiliary vents 26 are omitted, in which case the main HVAC assembly 34 and main vents 24 are arranged to condition the entire cabin 10.

The main HVAC assembly 34 comprises a main blower 38 that is positioned at the front of the vehicle 8, housed in a blower housing situated behind the instrument panel 18 in a region in front of a front passenger seat 12*a*. The main blower 38 includes a fan for generating a flow of air, which is directed through thermal equipment of the main HVAC assembly including heat exchangers and coolant circuits to heat and/or cool the air flow as necessary, so that the air flow is discharged from the HVAC assembly at a desired temperature. Operation of the main HVAC assembly 34 is controlled by the central control module 30, taking into account any commands received from either of the local control modules 28 of the front zones. The central control module 30 operates the main HVAC assembly 34 such that, when an automatic operating mode is active, air is discharged at a flow rate and temperature, which together define a heat flux, that is determined to meet a temperature demand in the cabin 10, as shall become clear from the description that follows.

Air discharged from the main HVAC assembly 34 is delivered through a transfer duct (not shown) to a distribution assembly 40 positioned centrally behind the instrument panel 18, which conveys air to the main vents 24 by a network of ducting 42. Specifically, a pair of ducts 42 extend generally transversely across the vehicle 8 in opposite directions from the distribution assembly 40, each front duct 42 connecting to a respective main vent 24 on the instrument panel 18 to convey air from the main HVAC assembly to the respective main vent 24. Further ducts 42 connect to the central main vents 24 in the instrument panel 18, and a final pair ducts 42 extend generally longitudinally through the rear centre console 22 to connect to respective ones of the main vents 24 mounted at the rear of the rear centre console 22. It will be appreciated that further ducting is provided to convey air to the main vents that are not visible in the figures.

The relative flow rates of air exiting each of the main vents 24 is controlled by the distribution assembly 40, which acts to divide the airflow discharged by the main HVAC assembly 34 between the various main vents 24 served by the main HVAC assembly 34, for example by operating flaps or other valve means that selectively open and close individual ducts 42. In this way, it is possible to control the front zones of the cabin 10 to different target temperatures using the main HVAC assembly 34 alone.

Correspondingly, the auxiliary HVAC assembly 36 comprises an auxiliary blower 44 and associated thermal equipment, and performs a similar function to the main HVAC assembly 34 but is used to serve the rear zones. As FIG. 2 shows best, the auxiliary HVAC assembly 36 is mounted at the rear of the vehicle 8, housed in a side region of the vehicle 8 above and behind a left rear wheel arch of the vehicle frame 32. As for the main HVAC assembly 34, the auxiliary HVAC assembly 36 comprises ducting 46 that connects the auxiliary HVAC assembly 36 to each of the auxiliary vents 26 to convey air discharged by the auxiliary HVAC assembly 36 to the auxiliary vents 26 to condition air in the rear zones of the cabin 10. As is typical, the auxiliary HVAC assembly 36 includes an integrated distribution assembly, so that the auxiliary HVAC assembly 36 is able to control how discharged air is divided between the auxiliary vents 26.

Operation of the auxiliary HVAC assembly 36 is controlled by the central control module 30 in a similar way to the operation of the main HVAC assembly 34, so that the auxiliary HVAC assembly 36 discharges air with a desired heat flux to meet temperature demands within the cabin 10. The central control module 30 takes into account any commands received from the local control modules 28 of the rear zones when generating control signals for the auxiliary HVAC assembly 36.

Also visible in FIGS. 2 to 4 are the local control modules 28, which are grouped into: a front control panel 48 that is mounted on the instrument panel 18 and comprises the two local control modules 28 associated with the front zones; and a rear control panel 50 that is mounted on the rear centre console 22 and comprises the two local control modules 28 associated with the rear zones.

Figure 5:
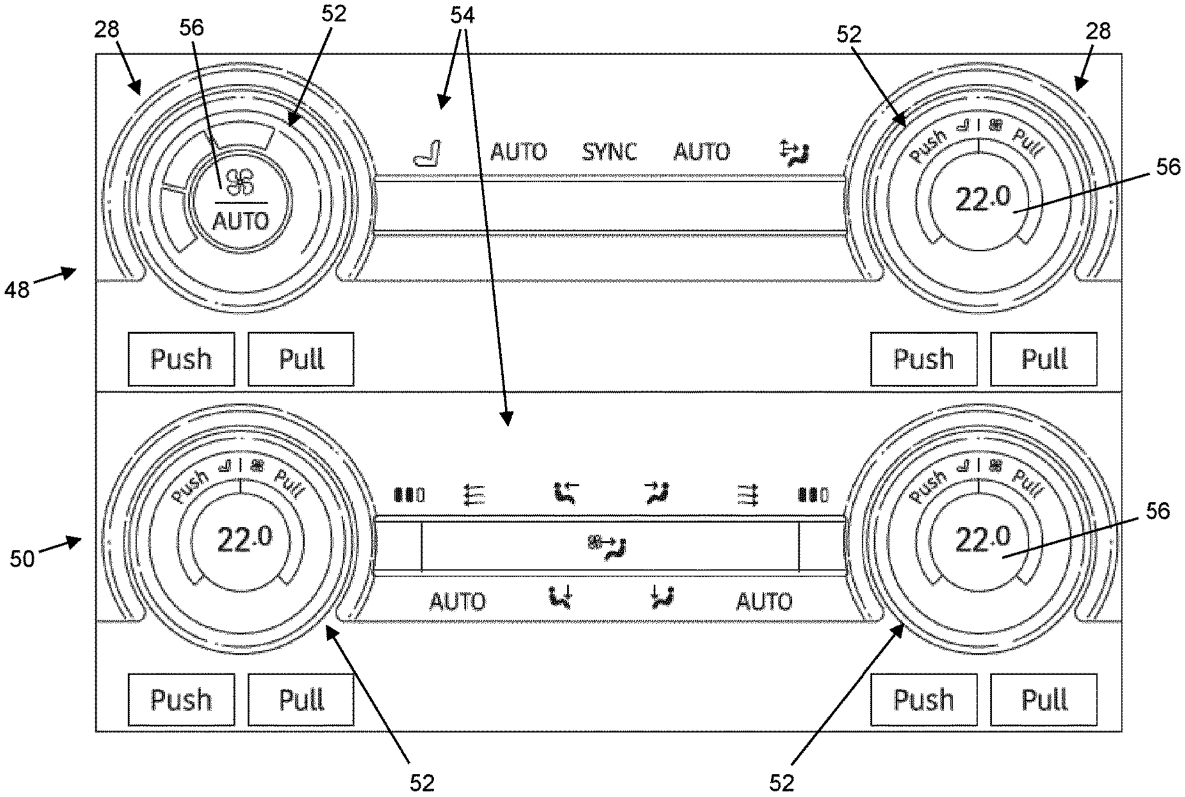
FIG. 5 shows local control modules of the vehicle of FIG. 1.

The front and rear control panels 48, 50 are shown more clearly in FIG. 5 which, for the purposes of illustration, shows the front control panel 48 immediately above the rear control panel 50.

Each control panel 48, 50 comprises a pair of control members 52, with one control member 52 at each end of the control panel 48, 50. Specifically, in this embodiment the control members 52 are embodied as rotary control members, although any suitable control members may be used in embodiments of the invention.

Each control member 52 defines part of a respective local control module 28. By way of example, the local control module 28 for the zone of the cabin 10 including the driver's seat 12*a* comprises the control member 52 shown to the right of the front control panel 48, which is the top right control member 52 of the four control members 52 shown in FIG. 5.

Each control member 52 also defines part of a user interface arrangement of the airflow system, to the extent that each user can interact with their local control member 52 to input a temperature or airflow demand for the zone in which they are seated. For example, the bottom right control member 52 shown in FIG. 5 belongs to the local control module 28 for the zone containing the rear right seat 12*b*, with which the second occupant 16 shown in FIG. 1 can interact. It follows that each local control module 28 acts as an input module.

The interface arrangement also includes a suite of displays that present relevant information to users. In this respect, each control panel 48, 50 includes a display 54 that is disposed between the respective pair of control members 52, the display 54 providing information to users relating to the selected operating mode, including whether a manual or automatic operating mode is active and the applicable airflow settings. In addition, a circular end face of each control member 52 comprises a control member display 56 that indicates the present target temperature for the associated zone. The control member display 56 also changes to indicate when the operating mode has changed, as illustrated by the top left control member 52 of FIG. 5.

In this respect, the control members 52 are of a known kind that a user can interact with in one of three ways: by rotating the control member 52; by pulling the control member 52 outwardly from the control panel 48, 50; or by pushing the control member 52 inwardly towards the control panel 48, 50. In this embodiment, rotating a control member 52 clockwise increments a target value for an airflow parameter, including a target temperature or air flow rate, and conversely rotating the control member 52 anticlockwise decrements the target value in a complementary manner.

By default, each local control module 28 is set in an automatic operating mode, in which case rotating the control member 52 increments or decrements a target temperature for the associated zone. However, the user has the ability to switch the local control module 28 to a manual operating mode by pulling the control member 52. The control member 52 can then be returned to the automatic operating mode by pushing the control member 52.

In known arrangements, pulling the control member 52 once toggles the relevant local control module 28 immediately to the manual operating mode, at which point the user can increment or decrement the air flow rate into the associated zone, through a series of defined airflow levels, by rotating the control member 52 clockwise or anticlockwise. However, as noted above the manual mode typically cannot be selected for one zone only, but must be selected for all zones sharing the same blower 38, 44. In this embodiment, the front two zones must enter the manual mode in tandem as they share the main blower 38, and similarly the rear two zones must activate the manual mode together as they share the auxiliary blower 44. In other embodiments having only the main HVAC assembly 34, all zones are put into the manual mode when any user demands it.

To enhance flexibility of control, in the present embodiment the local control modules 28 and central control module 30 are configured such that pulling a control member 52 once does not switch the associated local control module 28 directly into the manual mode. Instead, when a control member 52 is pulled for the first time, the associated local control module 28 remains in the automatic operating mode but allows the user to demand an increase or decrease in air flow rate through subsequent rotation of the control member 52. Any such demand made by the user is then met by the airflow system by adjusting the air flow rate as required, but in a manner that allows for continued control of the temperature in the associated zone. This may alternatively be referred to as placing the local control module 28 in a 'semi-automatic mode'. Only on pulling the control member 52 a second time is the local control module 28 placed into the manual mode, along with any other local control modules 28 sharing a common blower 38, 44, allowing the user to fix the air flow rate at a desired level. Once in the manual mode, the local control module 28 can be returned to the automatic operating mode by pushing the control member 52, as in previous arrangements.

Meeting a demand for a change in air flow without ceasing automatic control of the zone temperature is achieved by updating an airflow map that the central control module 30 uses to determine the air flow rate that should be discharged by the applicable blower 38, 44. This principle is illustrated by FIGS. 6 and 7.

Figure 6:
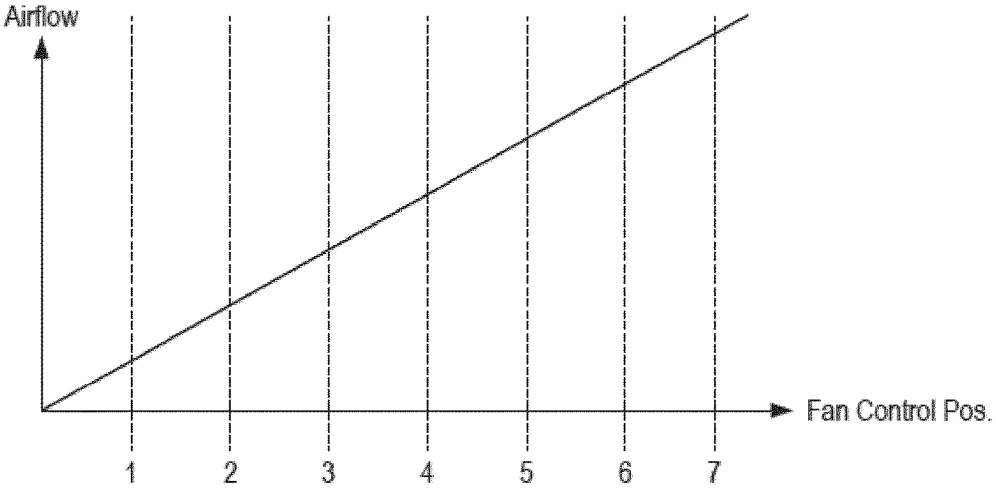
FIG. 6 is a graph representing a fan speed of the airflow system of the vehicle of FIG. 1 with respect to a user demand for a manual operating mode.

Starting with FIG. 6, this plot illustrates airflow control when the manual mode is selected. In this operating mode, discrete 'fan control positions' can be selected by a user, these fan control positions being numbered zero to seven in FIG. 6. For example, the fan control position may correspond to a literal angular position of the control member 52, or the fan control position may be incremented or decremented in response to turning and releasing the control member 52 if the control member 52 is configured to return to a rest position once released.

Figure 7:
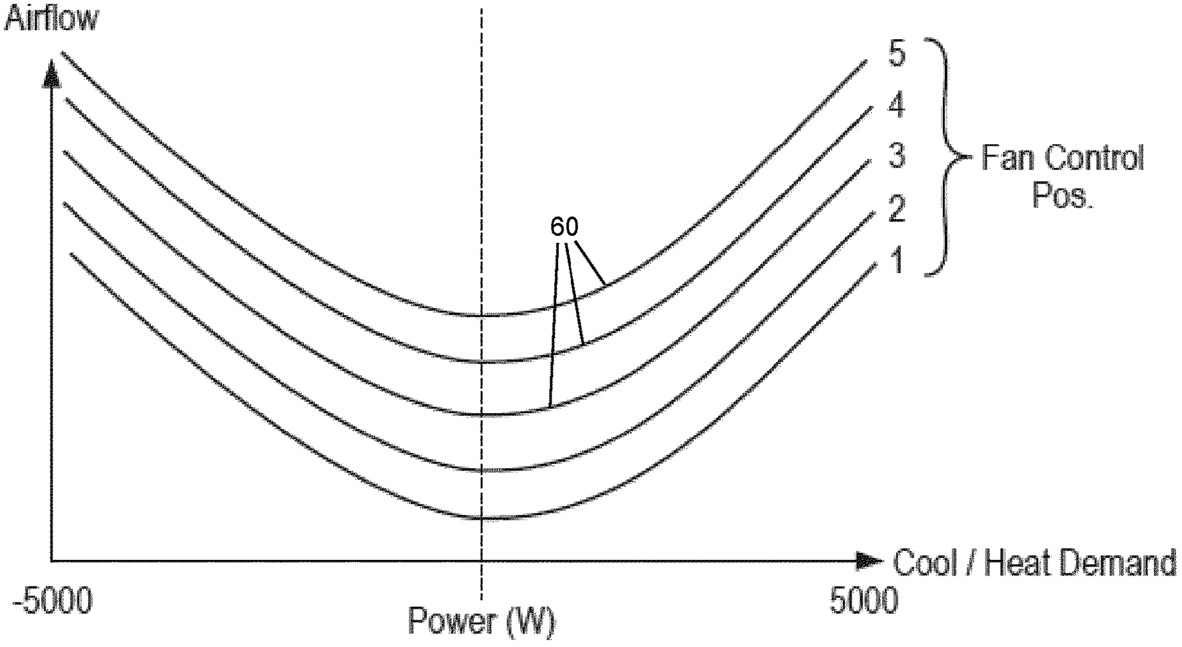
FIG. 7 is a graph showing a set of airflow maps for the airflow system of the vehicle of FIG. 1 for an automatic operating mode.

Each fan control position has an associated air flow rate, or fan intensity, and as FIG. 7 shows the air flow rate increases linearly with successive fan control positions. Notably, the air flow rate is fixed for each fan control position, such that the air flow rate does not vary with respect to a target temperature for a given zone when the manual mode is active. While the airflow system may be able to maintain a target temperature to some extent by varying the temperature of air supplied to the cabin 10, temperature control is greatly restricted by the loss of air flow rate as a control variable in the manual mode.

Moving on to FIG. 7, this graph shows how airflow is controlled when the automatic operating mode—or semi-automatic mode—is selected. Specifically, FIG. 7 shows a set of five airflow maps 60 by which the central control module 30 determines an appropriate air flow rate, and optionally air temperature, to meet a heating or cooling demand to move the cabin temperature towards a target value.

In known systems, a single airflow map 60 would be used in the automatic operating mode, but in the present embodiment multiple airflow maps 60 are defined, which enables the air flow rate to be varied without relinquishing temperature control by switching between different airflow maps 60. In this way, the airflow maps 60 are used for dynamically altering flow rates within an automatic operating mode in response to a user demand from a local control module 28. Accordingly, embodiments of the invention make use of existing features and hardware to expand the functionality of the airflow system and thereby enhance the user experience.

Each airflow map 60 defines a function of the air flow rate with respect to a temperature error, namely a deviation of a cabin temperature from a target temperature, the target temperature being represented by the vertical dashed line at the centre of FIG. 7. In this respect, the central control module 30 determines a temperature error for each zone with respect to target values received from the local control modules 28 and the temperature measurements received from the sensor network. A temperature error produces a corresponding cooling or heating power demand as indicated on the x-axis of FIG. 7, to the extent that the magnitude of the temperature error dictates the heating or cooling power required to reduce, and ideally eliminate, the error. Accordingly, the central control module 30 calculates the heating or cooling power required to correct the error, for example using a PI or PID controller, and controls the HVAC assemblies 34, 36 based on the determined power demand for each zone. Varying the power demand in turn alters the required airflow in accordance with known principles.

For example, if the cabin temperature as indicated by the network of sensors rises above the target temperature, this gives rise to a cooling power demand that is met by pumping cool air into the relevant zone. The greater the deviation above the target, the greater the cooling power demand and hence the higher the required flow rate of cool air. Conversely, if the cabin temperature drops below the target value a heating power demand will arise, which can be met by pumping warm air into the relevant zone.

In the present context, in a broad sense 'cool air' is air that is at a temperature below the target value, and 'warm air' is air that is at a temperature above the target value.

Accordingly, each airflow map 60 defines a curve that is substantially symmetrical about the target temperature, having a trough coinciding with the target temperature. The air temperature may either be constant or varied on each side of the target value, and if varied a temperature map can be defined in this respect. If the target temperature changes, the airflow maps 60 update and recalibrate as necessary.

The airflow maps 60 become progressively more aggressive moving upwards in FIG. 7, to the extent that each airflow map 60 defines a higher flow rate for a given power demand relative to the airflow map 60 beneath it.

It follows that if the airflow system is operating based on the lowermost airflow map 60 shown in FIG. 7, for example, and then shifts to the airflow map 60 immediately above, there will be a corresponding immediate increase in the flow rate of air delivered to the relevant zone due to the higher flow rates defined by the higher airflow map 60 for any given demand. Conversely, if the airflow system then reverts back to the lowermost airflow map 60, a corresponding decrease in airflow will ensue.

Using this principle, FIG. 7 assigns each airflow map 60 of the set to a respective fan control position, so that when a user interacts with a local control module 28 to select a specific fan control position, this is translated into a corresponding switch to the associated airflow map 60. FIG. 7 shows five airflow maps 60 corresponding to five fan control positions, although in practice any number of airflow maps 60 and associated fan control positions may be used.

By default, the central control module 30 operates the airflow system based on the airflow map 60 corresponding to fan control position 3 shown in FIG. 7, which is the middle airflow map 60 of the set. Accordingly, if a user pulls a control member 52 of a local control module 28 once, and then rotates the control member 52 clockwise to select fan control position 4 and therefore request increased airflow, the central control module 30 implements this request by shifting to the airflow map 60 corresponding to fan control position 4. This shift of airflow maps 60 will create an immediate increase in air flow intensity, which the user will perceive as meeting their demand. The airflow system remains in the automatic operating mode, however, and so temperature remains under control in all zones and other occupants of the vehicle 8 retain the ability to make demands relating to their respective zones.

The change in airflow map 60 will impact airflow in any zones sharing the same blower 38, 44. However, although occupants of those zones may notice the change in air flow rate, this is unlikely to cause a nuisance as the air flow rate varies during automatic operation in any event.

As the temperature in the zone in which the request was made moves towards the target value, the air flow rate will decrease again. The user may find this acceptable if the objective is to alter the temperature more aggressively. Alternatively, the user also has the option to request a further increase in air flow, in which case the central control module 30 selects the airflow map 60 corresponding to fan control position 5. The user has the further option of fixing the air flow rate at a desired level by pulling the control member 52 once more to select the manual operating mode and then selecting a fixed fan speed.

Requesting a reduced airflow is effected in a similar manner, and so entails pulling the control member 52 once to enable the fan control position to be altered and then rotating the control member 52 anticlockwise to reduce the fan control position.

It is noted that the airflow maps 60 may be configured such that an increase in flow rate from one map 60 to the next is accompanied by a corresponding change in the air temperature, such that the heat flux remains substantially unchanged after a shift between maps 60. In this way, the impact on temperature control caused by shifting maps 60 may be minimised.

Figure 8A:
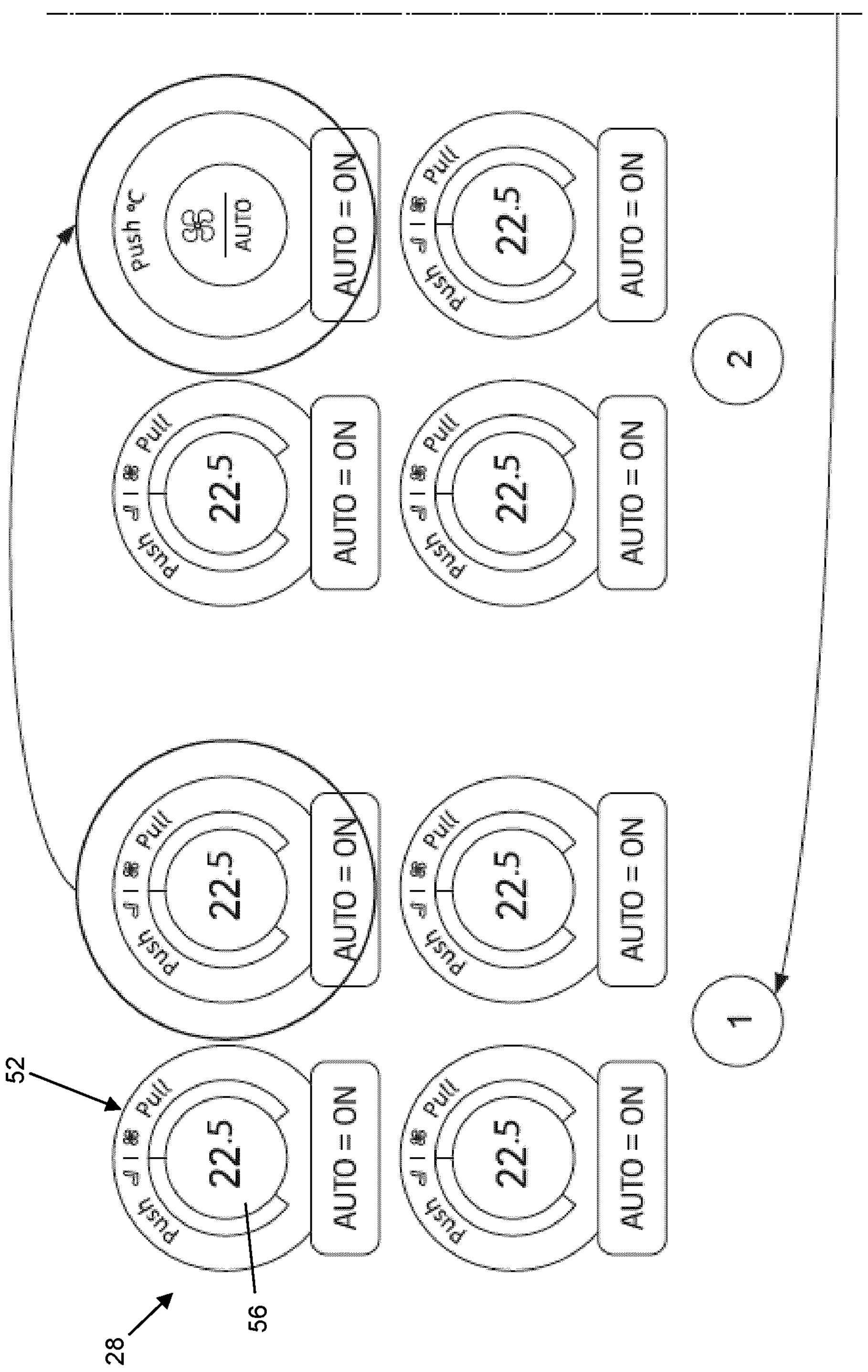
FIG. 8*a* shows a sequence of user interaction with the local control modules of FIG. 5.
Figure 8B:
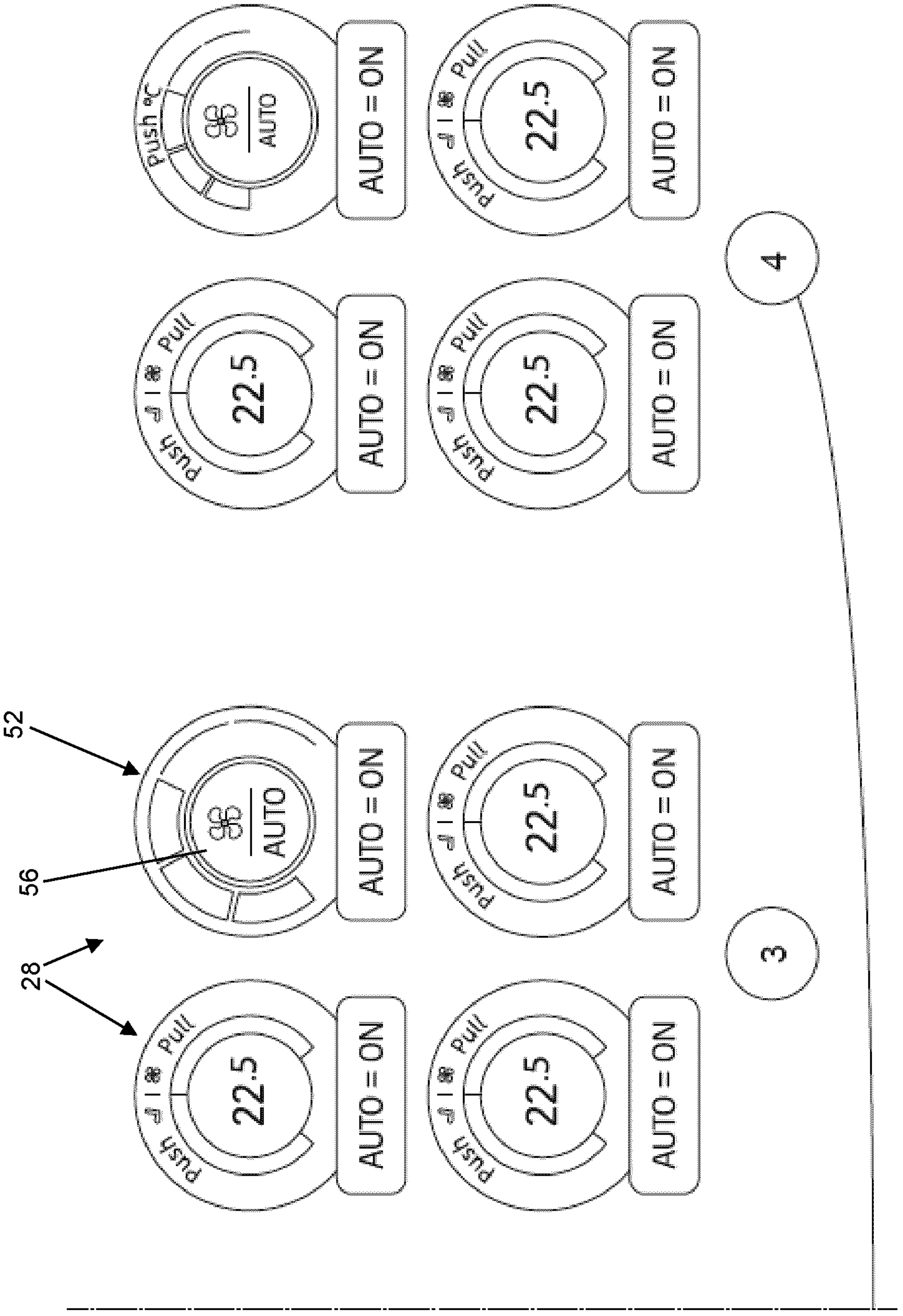
FIG. 8*b* shows a continuation of the sequence of user interaction with the local control modules of FIG. 5.

FIGS. 8*a* and 8*b* shows a worked example of a user interaction with the local control modules 28. For simplicity, FIGS. 8*a* and 8*b* shows only the control members 52 of the local control modules 28, the top right control member 52 corresponding to the local control module 28 of the zone containing the driver's seat 12*a*, and the bottom right control member 52 corresponding to the local control module 28 of the zone in which the second occupant 16 of FIG. 1 is seated.

At step 1 of the interaction in FIG. 8*a*, all of the local control modules 28 are set to the automatic operation mode. This may be indicated by a light on the associated displays 54, for example. Each control member display 56 shows the same target temperature of 22.5° C., meaning that the same target has been selected in each zone.

As indicated by the circle and arrow in FIG. 8*a*, the driver 14 pulls the control member 52 closest to them, to enable the fan control position to be changed. Accordingly, at step 2 of the interaction the top right control member 52 displays a change in status, indicating that the control member 52 is ready to receive a request for a new fan control position. Meanwhile, the displays 56 of the other control modules 28 are unchanged and the control modules remain in the automatic operating mode.

At step 3 on FIG. 8*b*, the driver 14 rotates the control member 52, at which point the newly selected fan control position is indicated by a dial at the top of the control member display 56. Once the control member 52 is released, the control module waits for a short period of, for example, five seconds, and then the new fan control position is implemented. This effects a shift of airflow map 60 by which the central control module 30 controls the main blower 38, creating the change in flow intensity in the driver's zone that was desired. Airflow into the other front zone will also increase, while the rear zones are unaffected.

Figure 9:
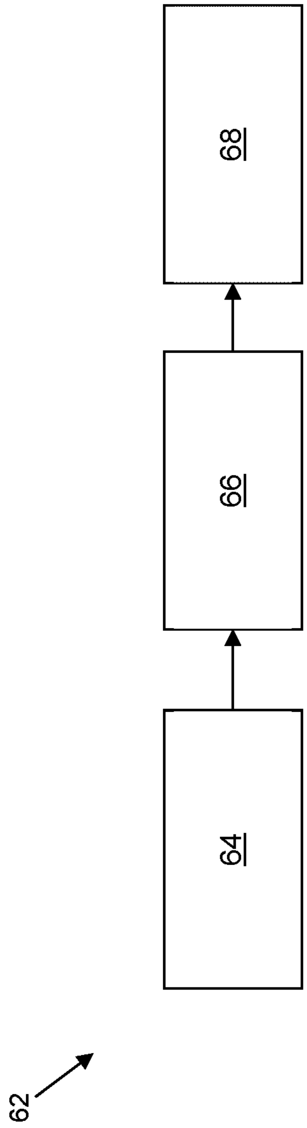
FIG. 9 shows a process for operating the airflow system of FIG. 2.

FIG. 9 summarises a process 62 performed by the central control module 30 to implement user demands to operate the airflow system. The process 62 begins when an airflow demand signal is received at step 64 by the central control module 30 from one of the local control modules 28. As set out above, such a signal is generated by pulling the respective control member 52 to select the semi-automatic operating mode, and then turning the control member 52 clockwise or anticlockwise to select a new air flow intensity level, or fan control position. These actions are communicated to the central control module 30 through a suitable signal. On receiving the signal, the central control module 30 determines at step 66 the airflow map 60 corresponding to the fan control position selected by the user, and updates operation at step 68 of the airflow system, and specifically the relevant HVAC system 34, 36, based on the determined airflow map 60. The central control module 30 may also operate the relevant distribution assembly to bias flow with respect to the source of the demand for altered airflow intensity, to minimise disruption in other zones of the cabin 10.

In summary, embodiments of the invention provide enhanced user control over a vehicle airflow system without altering the airflow apparatus through the use of airflow maps 60 to meet demands for altered flow rates into a vehicle cabin. This also beneficially reduces the likelihood of users switching the airflow system into a manual mode and therefore losing control of the cabin temperature to at least some extent and causing a nuisance to other occupants.

It will be appreciated that various changes and modifications can be made to the present invention without departing from the scope of the present application.

For example, instead of a set of predefined, calibrated airflow maps 60 such as those shown in FIG. 7, it is also possible to adjust a single airflow map 60 in a dynamic manner in response to a change in fan control position, for example using mathematical modelling or a look-up table.

Also, it is envisaged that a fully manual mode of operation may be dispensed with in some embodiments, where the ability to alter airflow intensity using the airflow maps 60 is considered to provide a sufficient degree of user adjustment options.

The invention claimed is:

1. A vehicle system for use in a vehicle, the vehicle system comprising:

an airflow system configured to condition air in a cabin of the vehicle, the airflow system comprising at least one air vent disposed in the cabin and an airflow apparatus configured to direct an airflow through the at least one vent;

an interface arrangement comprising a first input module and a second input module, the first and second input modules each being configured to issue airflow demand signals in response to user input; and a control system comprising one or more controllers, the control system being configured to:

receive an airflow demand signal issued by either of the first and second input modules;

determine, in accordance with the received airflow demand signal, an airflow map defining a function of an airflow parameter with respect to a cabin temperature and/or a cabin heating power demand; and operate the airflow system in accordance with the determined airflow map to control the airflow through the at least one vent;

wherein the first input module and/or the second input module has an automatic operating mode and a semi-automatic operating mode, wherein in the automatic operating mode, a control member of the module controls a target temperature, and wherein in the semi-automatic operating mode, the control member of the module controls the airflow demand signal to change the airflow map.

2. The vehicle system of claim 1, wherein the airflow parameter comprises a flow rate and/or a power level for a fan of the airflow apparatus.

3. The vehicle system of claim 1, wherein the airflow demand signals issued by the first and second input modules are indicative of a user demand for an altered flow rate through the at least one vent.

4. The vehicle system of claim 1, wherein the control system is configured to determine the airflow map by selecting the airflow map from a set of such airflow maps.

5. The vehicle system of claim 4, wherein each airflow map of the set defines a respective relationship between a flow rate and/or a power level for a fan of the airflow apparatus and the cabin temperature and/or the cabin heating power demand.

6. The vehicle system of claim 1, wherein the control system is configured to operate the airflow system to control a flow rate of air flowing through the at least one vent and/or to control a temperature of air flowing through the at least one vent.

7. The vehicle system of claim 1, wherein the airflow system comprises a first air vent configured to direct air into a first region of the cabin and a second air vent configured to direct air into a second region of the cabin.

8. The vehicle system of claim 7, wherein the first input module is configured to issue an airflow demand signal relating to airflow through the first vent and the second input module is configured to issue an airflow demand signal relating to airflow through the second vent.

9. The vehicle system of claim 8, wherein the control system is configured to:

operate the airflow system to control airflow through the first vent in accordance with a first airflow map determined in accordance with an airflow demand signal received from the first input module; and operate the airflow system to control airflow through the second vent in accordance with a second airflow map determined in accordance with an airflow demand signal received from the second input module.

10. The vehicle system of claim 1, wherein the first and second input modules are each associated with respective seats of the vehicle and wherein the interface arrangement comprises further input modules that are each associated with respective seats of the vehicle.

11. The vehicle system of claim 1, wherein the control member is a rotary control member, and or wherein each input module comprises a display.

12. The vehicle system of claim 1, wherein the interface arrangement comprises an interface module associated with an instrument panel of the vehicle.

13. The vehicle system of claim 1, wherein the airflow map defines a function of an airflow parameter with respect to a difference between the cabin temperature and a target cabin temperature.

14. The vehicle system of claim 1, wherein the first input module and/or the second input module is configured such that a mode switching action must be performed on the module before a user can input a request defining an airflow demand signal.

15. The vehicle system of claim 14, wherein the first input module and/or the second input module is configured such that performing the mode switching action a second time selects a manual operating mode.

16. The vehicle system of claim 14, wherein the mode switching action comprises pushing or pulling the control member of the first input module and/or the second input module.

17. The vehicle system of claim 1, wherein the control system is configured to receive signals indicative of the cabin temperature and a target temperature, and to process the received signals to determine the cabin heating power demand.

18. A vehicle comprising the vehicle system of claim 1.

19. A method of controlling a vehicle airflow system that is configured to condition air in a cabin of a vehicle, the airflow system comprising at least one air vent disposed in the cabin and an airflow apparatus configured to direct an airflow through the at least one vent, the method comprising:

receiving, from an input module associated with a seat of the vehicle, an airflow demand signal indicative of a user demand for an altered flow rate through the at least one vent;

determining, in accordance with the signal indicative of the airflow demand signal, an airflow map defining a function of an airflow parameter with respect to the cabin temperature and/or a cabin heating power demand; and operating the airflow system in accordance with the airflow map to control airflow through the at least one vent;

wherein the input module has an automatic operating mode and a semi-automatic operating mode, wherein in the automatic operating mode, a control member of the input module controls a target temperature, and wherein in the semi-automatic operating mode, the control member of the input module controls the airflow demand signal to change the airflow map.

20. A non-transitory computer-readable medium comprising computer software that, when executed by an electronic processor, is arranged to perform the method according to claim 19.

* * * * *